US011745750B2

(12) United States Patent
Ma et al.

(10) Patent No.: US 11,745,750 B2
(45) Date of Patent: Sep. 5, 2023

(54) SYSTEM AND METHOD OF LARGE-SCALE AUTOMATIC GRADING IN AUTONOMOUS DRIVING USING A DOMAIN-SPECIFIC LANGUAGE

(71) Applicant: CYNGN, INC., Menlo Park, CA (US)

(72) Inventors: Biao Ma, Sunnyvale, CA (US); Lior Tal, San Diego, CA (US)

(73) Assignee: CYNGN, INC., Menlo Park, CA (US)

( * ) Notice: Subject to any disclaimer, the term of this patent is extended or adjusted under 35 U.S.C. 154(b) by 0 days.

(21) Appl. No.: 18/047,952

(22) Filed: Oct. 19, 2022

(65) Prior Publication Data

US 2023/0117583 A1    Apr. 20, 2023

Related U.S. Application Data

(60) Provisional application No. 63/366,738, filed on Jun. 21, 2022, provisional application No. 63/257,530, filed on Oct. 19, 2021.

(51) Int. Cl.
*B60W 50/06* (2006.01)
*G07C 5/08* (2006.01)
(Continued)

(52) U.S. Cl.
CPC .......... *B60W 50/06* (2013.01); *B60W 60/001* (2020.02); *G07C 5/085* (2013.01);
(Continued)

(58) Field of Classification Search
CPC ............... B60W 50/06; B60W 60/001; B60W 2050/0031; B60W 2554/802; G07C 5/085
See application file for complete search history.

(56) References Cited

U.S. PATENT DOCUMENTS

2017/0061802 A1  3/2017  Barraci et al.
2019/0387060 A1*  12/2019  Kentley-Klay ..... G06F 3/04842
(Continued)

FOREIGN PATENT DOCUMENTS

WO       2013/060018 A1     5/2013

OTHER PUBLICATIONS

International Search Report and Written Opinion issued in corresponding application No. PCT/2022/047188, dated Feb. 8, 2023.

*Primary Examiner* — Peter D Nolan
*Assistant Examiner* — Ashley L Redhead, Jr.
(74) *Attorney, Agent, or Firm* — Maschoff Brennan

(57) ABSTRACT

A method may include obtaining input information that describes a driving operation of a vehicle and obtaining a rule that indicates an approved driving operation of the vehicle. The method may include parsing the rule using a domain-specific language to generate rule conditions in which the domain-specific language is a programming language that is specifically designed for analyzing driving operations of vehicles. The method may include representing the input information as observations relating to the vehicle in which each of the observations is comparable to one or more of the rules. The method may include comparing the observations to one or more respective comparable rule conditions and generating a grading summary that evaluates how well the observations satisfy the respective comparable rule conditions based on the comparison. A future driving operation of the vehicle may be adjusted based on the grading summary.

17 Claims, 7 Drawing Sheets

(51) Int. Cl.
*B60W 60/00* (2020.01)
*B60W 50/00* (2006.01)

(52) U.S. Cl.
CPC ............... *B60W 2050/0031* (2013.01); *B60W 2554/802* (2020.02)

(56) References Cited

U.S. PATENT DOCUMENTS

| | | | |
|---|---|---|---|
| 2020/0310403 A1 | 10/2020 | Huang et al. | |
| 2021/0157312 A1* | 5/2021 | Celia | H04W 52/16 |
| 2022/0009510 A1* | 1/2022 | Eberle | G06N 3/006 |
| 2022/0207988 A1* | 6/2022 | Ghosh | G08B 29/186 |
| 2022/0326664 A1* | 10/2022 | Kaberg Johard | G06N 20/10 |
| 2022/0343157 A1* | 10/2022 | Mankowitz | G06N 3/08 |
| 2022/0358749 A1* | 11/2022 | Yonetani | G06T 7/0004 |
| 2022/0366247 A1* | 11/2022 | Hamrick | G06N 3/04 |
| 2023/0117583 A1* | 4/2023 | Ma | B60W 60/001 |
| | | | 701/29.2 |

\* cited by examiner

SYSTEM AND METHOD OF LARGE-SCALE AUTOMATIC GRADING IN AUTONOMOUS DRIVING USING A DOMAIN-SPECIFIC LANGUAGE

CROSS-REFERENCE TO RELATED APPLICATIONS

This application claims the benefit of U.S. Patent Application Ser. No. 63/257,530, filed on Oct. 19, 2021, and U.S. Patent Application Ser. No. 63/366,738, filed on Jun. 21, 2022; the disclosures of which are incorporated herein by reference in their entireties.

FIELD OF THE INVENTION

The present disclosure generally relates to a system and method of large-scale automatic grading in autonomous driving using a domain-specific language.

BACKGROUND

An autonomous vehicle may scan an environment in which the autonomous vehicle is located using one or more sensors positioned on and/or around the autonomous vehicle. The autonomous vehicle may detect objects based on data collected by the sensors and avoid objects in a path of travel of the autonomous vehicle based on the detected objects.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method that includes obtaining input information that describes a driving operation of a vehicle and obtaining a rule that indicates an approved driving operation of the vehicle. The method may include parsing the rule using a domain-specific language to generate one or more rule conditions, the domain-specific language being a programming language that is specifically designed for analyzing autonomous operation of vehicles. The method may include representing the input information as one or more observations relating to the vehicle in which each of the observations is comparable to one or more of the rules. The method may include comparing the one or more observations to one or more respective comparable rule conditions and generating a grading summary that evaluates how well the observations satisfy the respective comparable rule conditions based on the comparing the observations to the respective comparable rule conditions. The method may include adjusting a future driving operation of the vehicle based on the grading summary.

In some embodiments, the grading summary may include an observation summary and a grading criteria summary, the observation summary indicating one or more respective observations and the grading criteria summary indicating one or more respective role conditions on which generating the grading summary was based.

In some embodiments, the method may further include sending the grading summary to a grading report data storage and making available, to a data user, the grading summary from the grading report data storage such that the data user is able to perform an analysis task based on the available grading summary.

In some embodiments, parsing the rule using the domain-specific language to generate the one or more rule conditions may include identifying conditional statements and threshold values corresponding to the rule.

In some embodiments, the observations may include mathematical representations of at least one of: a geometry of the AV, an orientation of the AV, a projected movement path of the AV, a starting point of the AV, a destination of the AV, and one or more distances between the AV and one or more objects in the vicinity of the AV.

In some embodiments, the method may be performed autonomously without interaction from a human user.

In some embodiments, the method may be performed with respect to input information that describes one million or more driving operations.

In some embodiments, the vehicle may be an autonomous vehicle.

One or more embodiments of the present disclosure may include one or more non-transitory computer-readable storage media configured to store instructions that, in response to being executed, cause a system to perform operations. The operations may include obtaining input information that describes a driving operation of a vehicle and obtaining a rule that indicates an approved driving operation of the vehicle. The operations may include parsing the rule using a domain-specific language to generate one or more rule conditions, the domain-specific language being a programming language that is specifically designed for analyzing autonomous operation of vehicles. The operations may include representing the input information as one or more observations relating to the vehicle in which each of the observations is comparable to one or more of the rules. The operations may include comparing the one or more observations to one or more respective comparable rule conditions and generating a grading summary that evaluates how well the observations satisfy the respective comparable rule conditions based on the comparing the observations to the respective comparable rule conditions. The operations may include adjusting a future driving operation of the vehicle based on the grading summary.

In some embodiments, the grading summary may include an observation summary and a grading criteria summary, the observation summary indicating one or more respective observations and the grading criteria summary indicating one or more respective role conditions on which generating the grading summary was based.

In some embodiments, the operations may further comprise sending the grading summary to a grading report data storage and making available, to a data user, the grading summary from the grading report data storage such that the data user is able to perform an analysis task based on the available grading summary.

In some embodiments, parsing the rule using the domain-specific language to generate the one or more rule conditions may include identifying conditional statements and threshold values corresponding to the rule.

In some embodiments, the observations may include mathematical representations of at least one of: a geometry of the AV, an orientation of the AV, a projected movement path of the AV, a starting point of the AV, a destination of the AV, and one or more distances between the AV and one or more objects in the vicinity of the AV.

In some embodiments, the operations may be performed autonomously without interaction from a human user.

In some embodiments, the operations may be performed with respect to input information that describes one million or more driving operations.

In some embodiments, the vehicle may be an autonomous vehicle.

One or more embodiments of the present disclosure may include a system that includes one or more processors and one or more non-transitory computer-readable storage media configured to store instructions that, in response to being executed, cause the system to perform operations. The operations may include obtaining input information that describes a driving operation of a vehicle and obtaining a rule that indicates an approved driving operation of the vehicle. The operations may include parsing the rule using a domain-specific language to generate one or more rule conditions, the domain-specific language being a programming language that is specifically designed for analyzing autonomous operation of vehicles. The operations may include representing the input information as one or more observations relating to the vehicle in which each of the observations is comparable to one or more of the rules. The operations may include comparing the one or more observations to one or more respective comparable rule conditions and generating a grading summary that evaluates how well the observations satisfy the respective comparable rule conditions based on the comparing the observations to the respective comparable rule conditions. The operations may include adjusting a future driving operation of the vehicle based on the grading summary.

In some embodiments, the grading summary may include an observation summary and a grading criteria summary, the observation summary indicating one or more respective observations and the grading criteria summary indicating one or more respective role conditions on which generating the grading summary was based.

In some embodiments, the operations may further comprise sending the grading summary to a grading report data storage and making available, to a data user, the grading summary from the grading report data storage such that the data user is able to perform an analysis task based on the available grading summary.

In some embodiments, parsing the rule using the domain-specific language to generate the one or more rule conditions may include identifying conditional statements and threshold values corresponding to the rule.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

The present disclosure relates to reviewing and grading operations of an autonomous vehicle (AV). A method and/or a system of grading operations of the AV according to at least one embodiment of the present disclosure may improve AV operations by diagnosing and/or highlighting areas in which the AV operations function successfully and/or areas in which the AV operations need improvement. In some situations, the AV operations may be simulated prior to implementation of the AV operations because the AV operations may involve complex and life-critical computing processes. In these and other situations, the AV operations may be represented by a scenario set that includes a wide variety of environmental settings, vehicle-object interactions, some combination thereof, or any other scenarios that a given AV may experience during operation of the given AV. For example, a given scenario may involve assessing how the given AV interacts with an adult pedestrian versus a child pedestrian based on real-world data and/or simulated data. An additional or alternative example may include a given scenario that involves assessing how the given AV behaves in clear weather conditions versus under heavy rain conditions.

Modeling and/or configuring an autonomous driving system that considers a wide range of scenarios may involve processing many computations before, during, and/or after performance of operations of a given AV associated with the autonomous driving system. To process these and other computations, a driving operation grading system may be configured to review actual operations of the given AV and/or simulated operations of the given AV and grade the reviewed operations. Because of the large volume of potential scenarios included in the actual and/or simulated operations of the autonomous driving system of the given AV, a human user may be unable to manually review and/or audit the performance of the autonomous driving system, and it may be desirable for the driving operation grading system to assess the scenario set associated with the autonomous driving system at an accelerated computational rate beyond human comprehension speeds as described in relation to one or more embodiments of the present disclosure.

Embodiments of the present disclosure will be explained with reference to the accompanying drawings.

Figure 1:
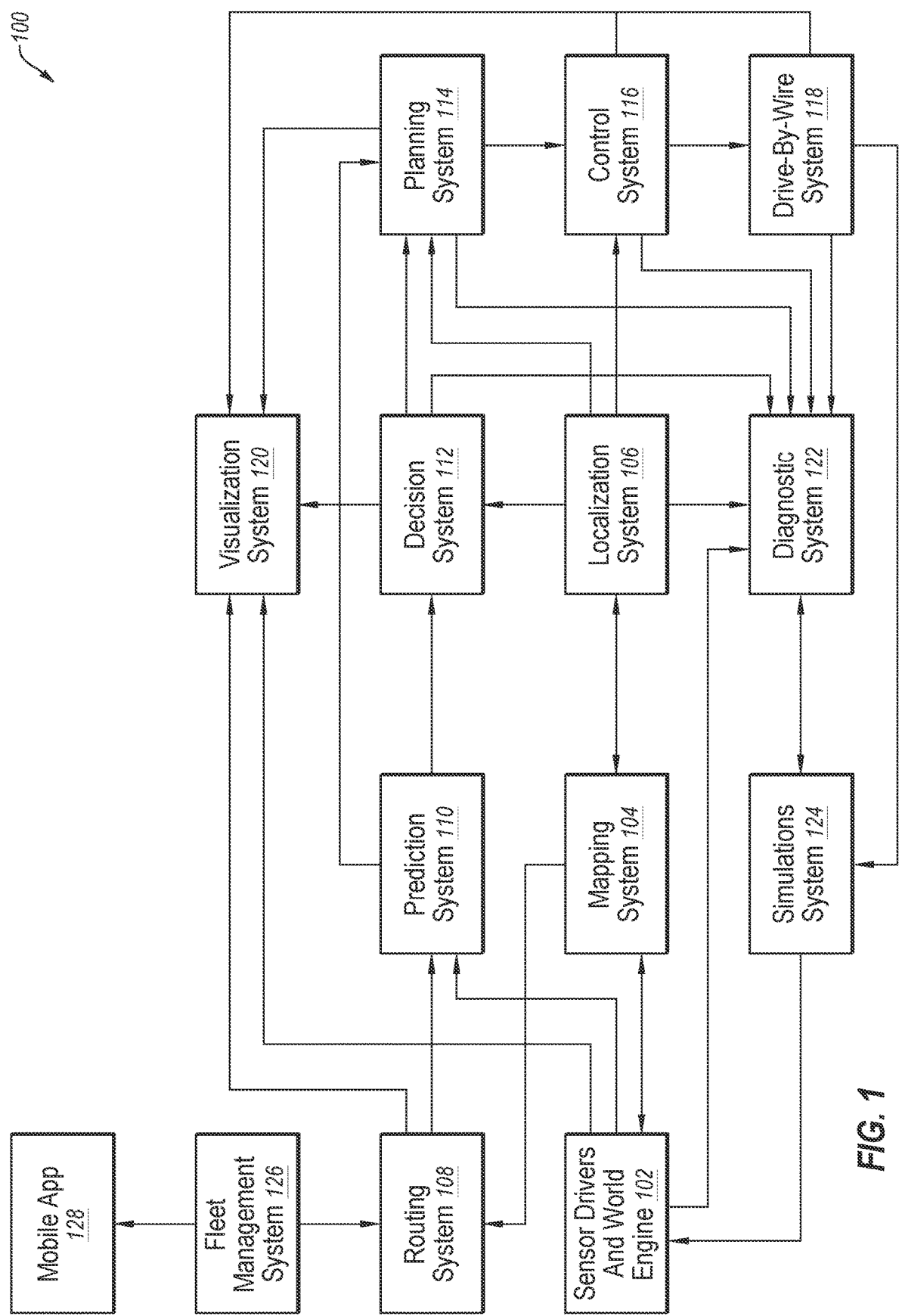
FIG. 1 illustrates an example embodiment of an autonomous driving system according to one or more embodiments of the present disclosure.

FIG. 1 illustrates an example embodiment of an autonomous driving system 100 according to at least one embodiment of the present disclosure. The autonomous driving system 100 may include one or more computer systems and/or software modules configured to perform one or more operations involved with driving an autonomous vehicle. Various aspects of the autonomous driving system 100 may be included on-board with the autonomous vehicle itself, or with a remote system in communication with the autonomous vehicle, such as a cloud computing system, a server, or a mobile device. In some embodiments, the autonomous driving system 100 may include sensor drivers and a world engine 102 that is configured to capture and process sensor data relating to an environment in which the autonomous vehicle travels, such as information relating to what objects are present in the environment and where such objects are located relative to the autonomous vehicle. The sensor data related to the autonomous vehicle's environment may be sent to a mapping system 104 to generate a virtual map of the environment. In some embodiments, the virtual map may be sent from the mapping system 104 back to the sensor drivers and world engine 102 to provide a map on which the sensor data relating to environmental objects may be oriented. Additionally or alternatively, the virtual map may provide a map onto which environmental topography may be plotted.

The virtual map of the mapping system 104 may be sent to a localization system 106 and/or a routing system 108. The localization system 106 may provide an estimated location of the autonomous vehicle within the environment and/or the virtual map, and the routing system 108 may compute a route between the estimated location of the autonomous vehicle to a designated destination along a valid path included in the virtual map.

In some embodiments, the sensor data of the sensor drivers and world engine 102 may be sent to a prediction system 110 that is configured to predict movement and/or trajectories of one or more objects in the vicinity of the autonomous vehicle and/or the autonomous vehicle itself. A decision system 112 may obtain the predicted object trajectories from the prediction system 110, and based on a location of the autonomous vehicle as determined by the localization system 106, the decision system 112 may determine one or more driving decisions according to various driving rules. The driving decisions determined by the decision system 112 may be sent to a planning system 114 that processes, parses, and/or queues the driving decisions for a downstream control system 116. In some embodiments, the control system 116 may generate control commands that are obtained by a drive-by-wire system 118 or another actuation system that controls one or more operations of the autonomous vehicle.

In some embodiments, the autonomous driving system 100 may include a visualization system 120 that is configured to obtain information from the sensor drivers and world engine 102, the prediction system 110, the decision system 112, the planning system 114, the control system 116, the drive-by-wire system 118, or any other computer system of the autonomous driving system 100. The visualization system 120 may generate two-dimensional and/or three-dimensional models of the autonomous vehicle, objects in the vicinity of the autonomous vehicle, and/or the environment in which the autonomous vehicle operates. Additionally or alternatively, the visualization system 120 may provide a visual representation of movement and/or predicted trajectories of the autonomous vehicle and/or any of the nearby objects.

In some embodiments, the autonomous driving system 100 may include a diagnostics system 122 that is configured to obtain information from the sensor drivers and world engine 102, the prediction system 110, the decision system 112, the planning system 114, the control system 116, the drive-by-wire system 118, or any other computer system of the autonomous driving system 100. The diagnostics system 122 may run diagnostic tests to assess the accuracy and/or validity of determinations and decisions made by other computer systems of the autonomous driving system 100.

In these and other embodiments, the diagnostics system 122 may be communicatively coupled to a simulations system 124 that provides a virtual environment in which the determinations and decisions made by other computer systems and/or software modules of the autonomous driving system 100 may be simulated to identify any issues with the simulated determinations and decisions. Additionally or alternatively, the simulations system 124 may obtain information from the drive-by-wire system 118 so that the simulations system 124 may run simulations based on control commands implemented by the autonomous vehicle in the real world. The simulations system 124 may virtually determine movements of the autonomous vehicle and/or of one or more objects in the vicinity of the autonomous vehicle. Based on the virtually determined movements, the simulations system 124 may determine updated positions of the autonomous vehicle and/or of the surrounding objects. In some embodiments, the simulations system 124 may provide the virtually determined movements and/or the updated positions to the sensor drivers and world engine 102 so that the total measurable world as represented by the sensor drivers and world engine 102 may be updated based on the simulation results.

In some embodiments, the autonomous driving system 100 may include a fleet management system 126 that obtains information from multiple autonomous vehicles communicatively coupled to the fleet management system 126. The fleet management system 126 may relay information between different autonomous vehicles in communication with the fleet management system 126 to coordinate operations of the multiple autonomous vehicles. In these and other embodiments, a user managing fleet operations may use a mobile app 128 to receive information from and/or send information or commands to a fleet of autonomous vehicles.

Modifications, additions, or omissions may be made to the autonomous driving system 100 without departing from the scope of the present disclosure. For example, the designations of different elements in the manner described is meant to help explain concepts described herein and is not limiting. For instance, in some embodiments, the sensor drivers and world engine 102, the mapping system 104, the localization system 106, the routing system 108, the prediction system 110, the decision system 112, the planning system 114, the control system 116, the drive-by-wire system 118, the visualization system 120, the diagnostics system 122, the simulations system 124, the fleet management system 126, and the mobile app 128 are delineated in the specific manner described to help with explaining concepts described herein but such delineation is not meant to be limiting. Further, the autonomous driving system 100 may include any number of other elements or may be implemented within other systems or contexts than those described.

Figure 2A:
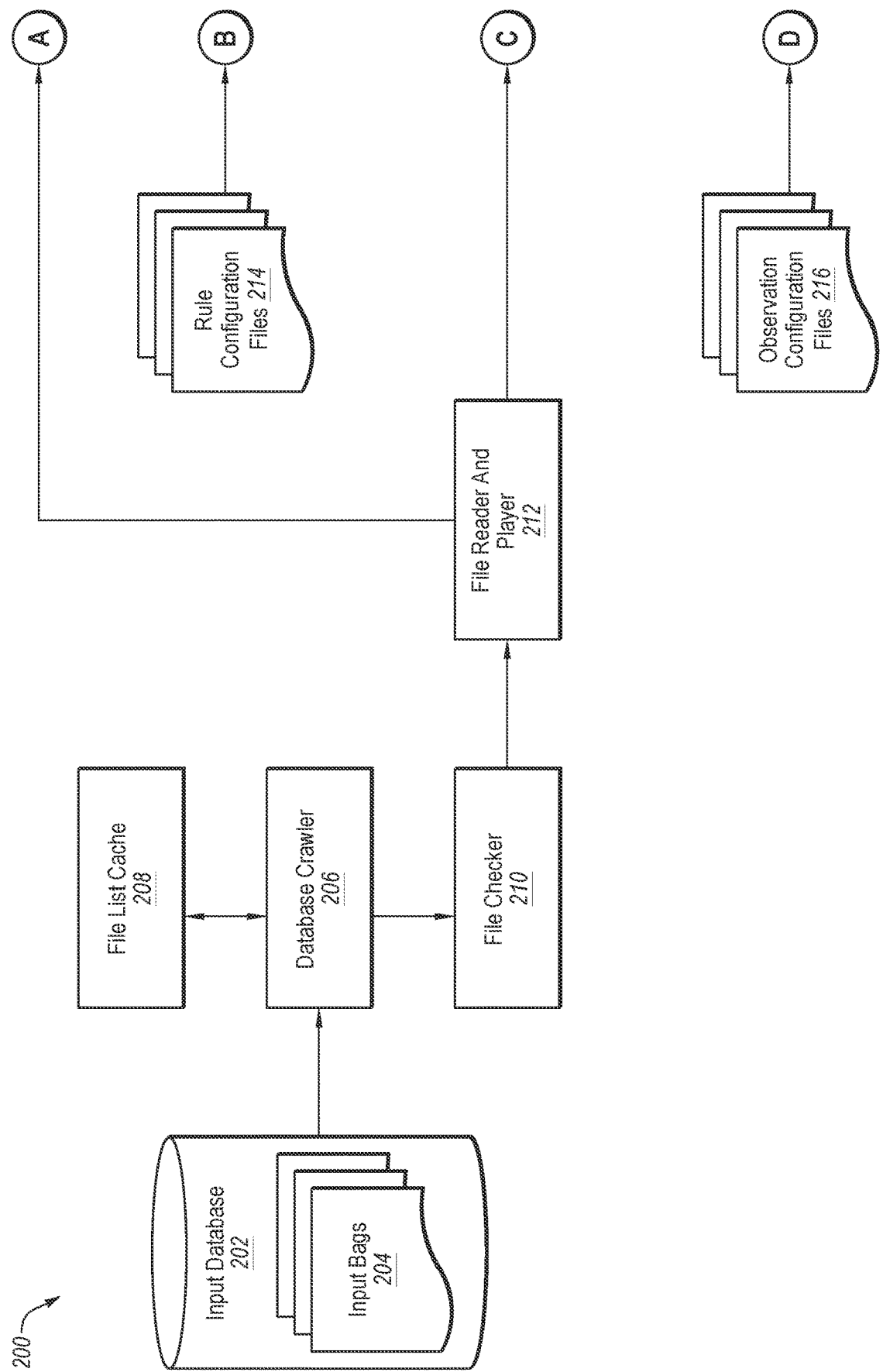
FIGS. 2A-2C illustrate a diagram of a system architecture of a grading system according to the present disclosure.
Figure 2B:
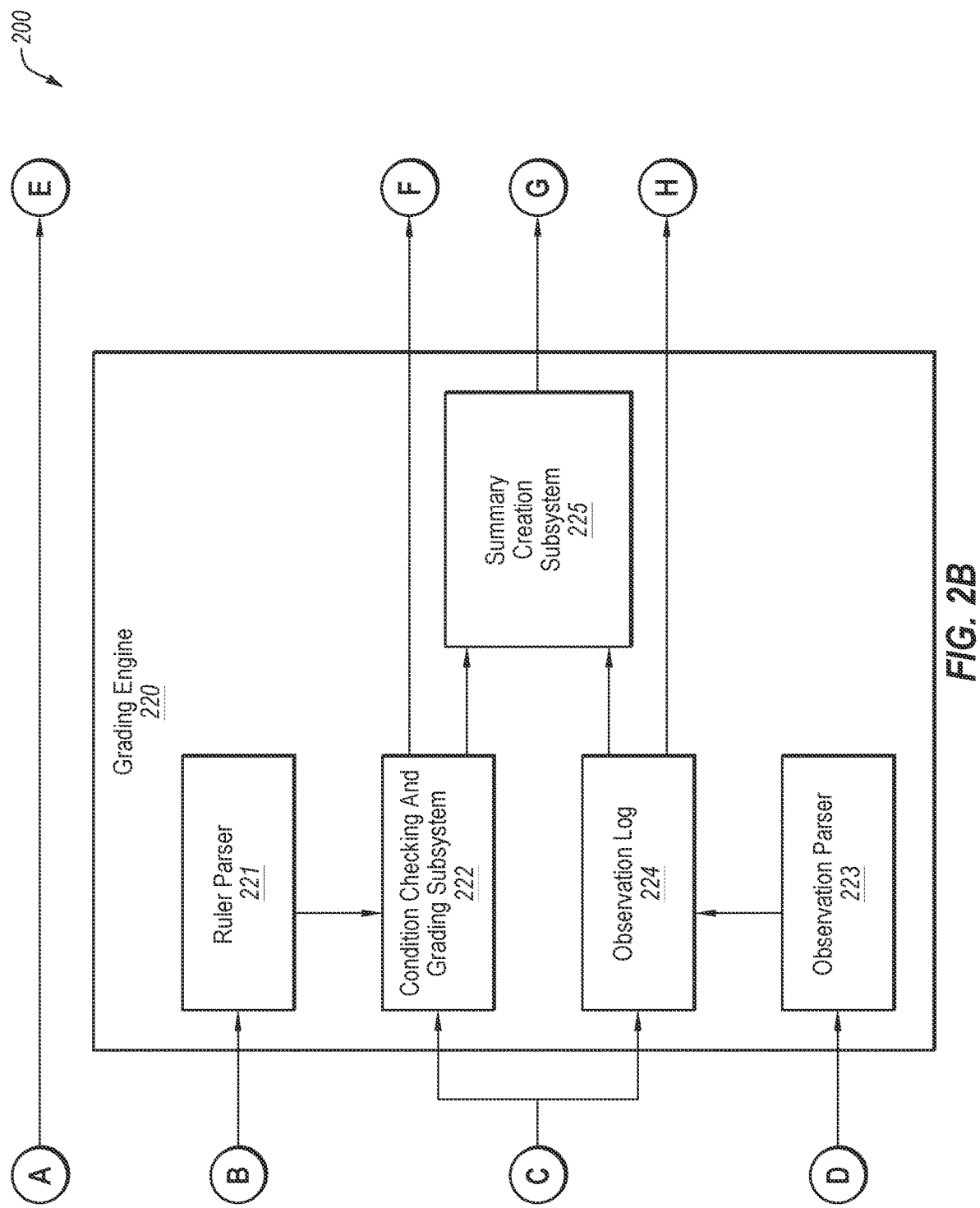
Figure 2C:
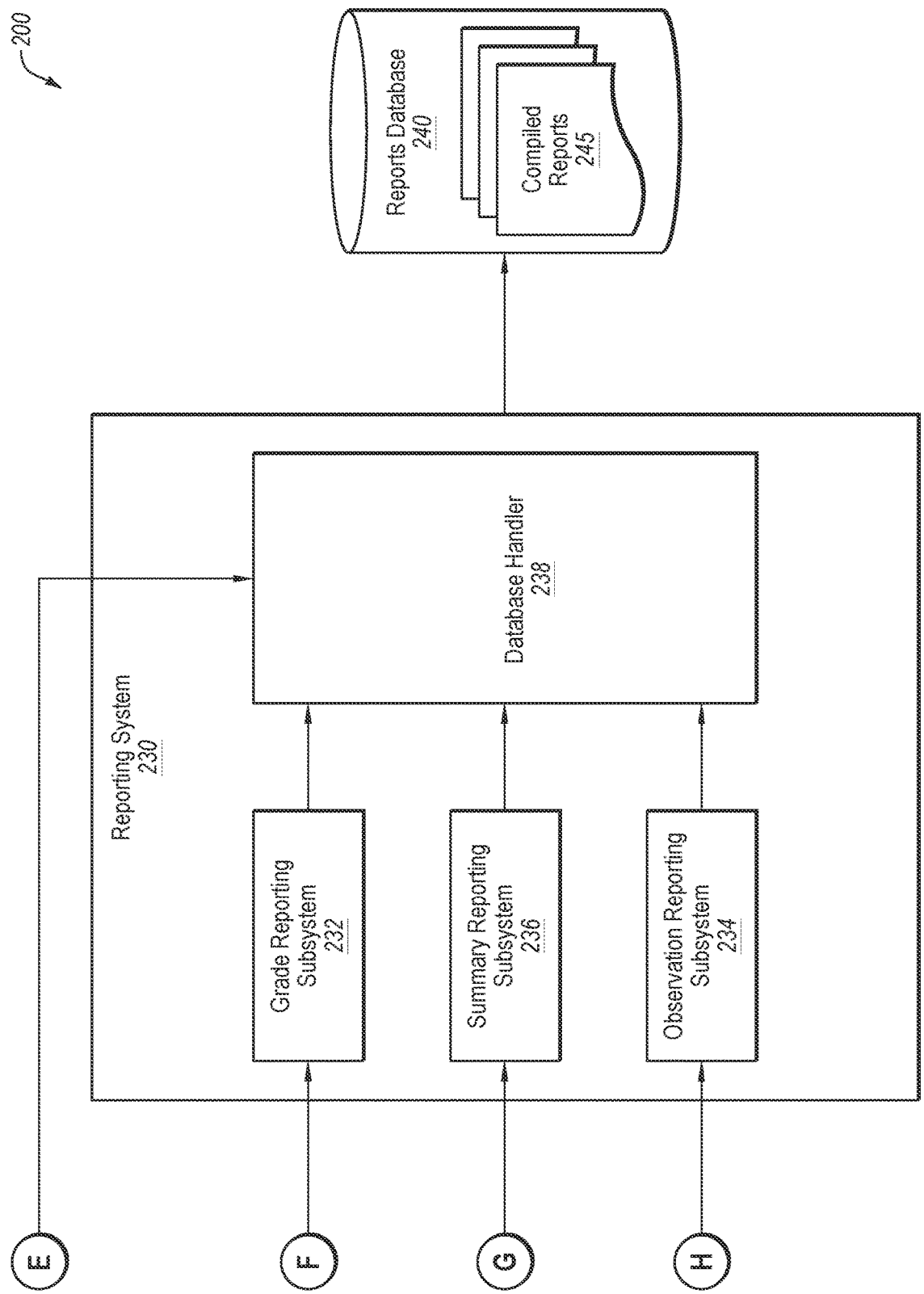

FIGS. 2A-2C illustrate a diagram of a system architecture of a driving operation grading system 200 according to one or more embodiments of the present disclosure. The driving operation grading system 200 may include a grading engine 220 configured to identify one or more rules by which the grading engine 220 may assess simulated performance of the AV. After assessing the performance of the AV, the grading engine 220 may generate a report summary detailing the performance assessment, which may be stored and/or analyzed (e.g., compared to other report summaries generated by the grading engine), which may be obtained by a reporting system 230 and/or stored in a reports database 240. Additionally or alternatively, the report may be output to a user.

In some embodiments, the driving operation grading system 200 may include one or more system components that are configured to identify and/or retrieve information to be used by the grading engine 220. Such system components may improve the scalability and/or flexibility of the driving operation grading system 200 to accommodate large amounts of real-world data and/or various simulation scenarios. For example, the driving operation grading system 200 may include a database crawler 206 configured to review and retrieve data included in an input database 202 for use by the grading engine 220. The input database 202 may include information that describes multiple different simulation environments, AV perception systems, AV localization methods, some combination thereof, or any other information related to operation of the AV. The database crawler 206 may review information included in the input database 202 and retrieve any operation information relevant to a given operation environment and/or simulation scenario being graded by the grading engine. In these and other embodiments, the database crawler 206 may package the input information as an input bag 204 such that the input bag 204 may be more easily and/or efficiently utilized. Such an input bag 204 may include all of the information utilized in performing a given simulation and/or associated with one or more given operations of the AV. For example, the input bag 204 may include a perception, localization, projected tasks, surrounding objects, or any other information that may be included in the simulation for a two-second window, a five-second window, a ten-second window, and/or any other window of time that is to be simulated. As used herein, the term "bag" may refer to any array, collection, grouping, packaging, or other assortment of data that may be gathered and/or combined for a common use, such as for use by the driving operation grading system 200.

In some embodiments, a file list cache 208 may be implemented to cache information frequently included in the input bag 204 prepared by the database crawler 206. The file list cache 208 may cache any files (e.g., data and/or metadata) included in the input bag 204 that are useful for calculations such that the cached files may be more quickly retrieved by other components of the driving operation grading system 200, such as the grading engine 220. For example, the files cached by the file list cache 208 may include temporally relevant files (e.g., recently and/or frequently used files) and/or spatially relevant files (e.g., files related to a target location).

A file checker 210 may review and/or verify the simulation information retrieved by the database crawler 206 and/or the files cached by the file list cache 208. In some embodiments, the file checker 210 may verify that the simulation information is properly aligned in terms of versioning. For example, a given semantic map retrieved from the input database 202 may have been generated on a first version of a simulation system, but the simulation system is currently operating according to a second, more updated version. In this and other examples, the given semantic map may not provide reliable information because of the versioning differences between the first version and the second version of the simulation system. As another example, the data format in an earlier version may be inconsistent with that in a later version. Additionally or alternatively, the file checker 210 may verify any other aspects of the simulation information, such as identifying corrupted files, validating cloud computing nodes, etc.

Operations associated with the input database 202, the database crawler 206, the file list cache 208, and/or the file checker 210 may facilitate review and grading of simulation information at a large scale (e.g., at a rate of one thousand hertz, ten thousand hertz, one-hundred thousand hertz, one million hertz, etc. depending on the process speed of a computing system). Preparing simulation information and/or operation information for analysis by the grading engine 220 using the input database 202, the database crawler 206, the file list cache 208, and/or the file checker 210 may allow for review of large quantities of information at an accelerated rate.

In some embodiments, one or more rule configuration files 214 may describe rules that specify one or more grading criteria for the grading engine 220. The rule configuration files 214 may be written in a domain-specific language such that a rule parser 221 of the grading engine 220 may review each of the rule configuration files 214 to identify one or more rules by which the grading of the AV performance may be assessed. In these and other embodiments, the rule parser 221 may identify specific operators, words, symbols, phrases, etc. included in the rule configuration files that indicate the presence of a rule. For example, the rule parser 221 may identify keywords such as "if," "then," and/or "while" to identify a starting point of a given rule and identify other details of the rule based on the starting point.

Additionally or alternatively, the domain-specific language associated with the rule configuration files 214 and the rule parser 221 may involve translating one or more rules provided in a human-understandable context into a mathematical and/or programmatic representation of the rules that may be interpreted by a computing system. In some embodiments, translating human-understandable rules into computer-interpretable rules may involve parsing the rules by the rule parser 221 into various components, such as conditions for satisfying the rules, parameters and/or specifications of the AV that are relevant to particular rules, or any other rule components. For example, a given rule may state that the AV must reach its destination. The rule parser 221 may interpret the given rule using a domain-specific language that is specifically tailored for software programming with respect to autonomous operation of vehicles in which the domain-specific language is configured to facilitate determining whether the given rule may be represented by one or more conditional statements relating to a current position of the AV, displacement of the AV over a given time period, an updated position of the AV after the given time period, a distance between the AV and a target destination, and/or any other metrics that may represent movement of the AV towards its destination. In other words, the domain-specific language may involve a programming language that is designed for a particular domain (e.g., to operate in the domain of autonomous vehicles to analyze autonomous driving operations and/or rules related to driving of vehicles and/or AVs). As an additional or alternative example, a given rule may state that the AV must not collide with any objects, which may be parsed by the rule parser 221 as including conditional statements relating to displacement of the AV, positions of one or more objects in the vicinity of the AV, boundaries of the AV, boundaries of the objects in the vicinity of the AV, and/or any other metrics that relate to positioning of the AV relative to the objects.

Additionally or alternatively, the rule parser 221 may determine that the given rule involves a single binary operator (e.g., AND, OR, XOR, etc.) and/or multiple binary operators and a conditional statement corresponding to the one or more binary operators that checks for overlap between the boundaries of the AV and the boundaries of the objects in the vicinity of the AV. The AV simulation may be assessed according to the binary operators of the given rule to determine a grade for the AV simulation under the given rule (e.g., a grade of "pass" corresponding to a value of "TRUE" or "1" while a grade of "fail" corresponding to a value of "FALSE" or "0").

Additionally or alternatively, the given rule may include multiple potential responses such that the grading of the AV simulation according to the given rule may include more nuanced information. In some embodiments, a rule may include three or more possible responses in which each of the possible responses corresponds to a range of values of one or more parameters of the AV simulation. For example, a given rule relating to acceleration of the AV may be assessed as being "uncomfortable" acceleration (e.g., a first range acceleration values), "highly uncomfortable" acceleration (e.g., a second range of acceleration values greater than the first range), or "comfortable" acceleration (e.g., a third range of acceleration values less than the first range).

In some embodiments, the grading process may include obtaining a driving signal, such as a movement command for the AV, and generating a simulation implementing the driving signal by the AV. The grading engine 220 may obtain one or more observation configuration files 216 that describe each frame of a driving operation. A given observation configuration file 216 may include a computation log that involves one or more components of the input information provided by the input bags 204 and/or the input database 202. For example, a given observation configuration file 216 may include a mathematical representation of a speed of a given AV over a given period of time, such as a one-second window, a two-second window, a three-second window, a five-second window, or any other period or periods of time. In these and other embodiments, an observation parser 223 of the grading engine 220 may be configured to autonomously calculate parameters associated with each of the frames of the driving operation without input from a human user. For example, the observation parser 223 may calculate geometries, orientations, projected paths of movement, starting points, ending points, distances to objects, and/or any other parameters relating to the AV and/or objects in the vicinity of the AV based on the information provided in the observation configuration files 216. In these and other examples, the parameters identified and/or computed by the observation parser 223 may include one or more of the components of the observation configuration files 216. Additionally or alternatively, the observation parser 223 may compute parameters based on the observation configuration files 216 that may or may not be included in the components of the observation configuration files 216.

Based on the results of the observation parser 223, the grading engine 220 may generate an observation log 224 that includes information assessable according to a condition checking and grading subsystem 222 operating based on information provided by the rule parser 221. The grading engine 220 may autonomously determine whether one or more of the rules are satisfied by the information included in the observation log 224, and a summary creation subsystem 225 may be configured to generate a grading summary that provides an overview of how well the observation log 224 satisfied the rules. In other words, the grading summary generated by the summary creation subsystem 225 may indicate a grade of the observation log 224 with respect to the specified rules. Whether the observation log 224 satisfies the specified rules may involve comparing the information included in the observation log 224 to the specified rules using one or more Boolean operators and/or according to one or more threshold values associated with the specified rule.

In some embodiments, the file reader and player 212 may trigger operations of the grading engine 220 at a specified frequency to ensure that the operations of the grading engine 220 are consistent and/or synchronized. The file reader and player 212 may specify a set frequency at which the grading engine 220 is to operate (e.g., ten hertz or cycles per second) such that computations performed in relation to rule parsing, observation logging, and/or grading simulation performance remain synchronized for each given frame of a simulation loop.

Additionally or alternatively, the grading summaries generated by the summary creation subsystem 225 may be sent to a reporting system 230 that includes a grade reporting subsystem 232, an observation reporting subsystem 234, and/or a summary reporting subsystem 236. In some embodiments, the grade reporting subsystem 232 may aggregate and sort the grading summaries generated by the summary creation subsystem 225 such that a user reviewing the aggregated grading summaries may understand whether and/or how given driving operations performed according to the rules provided by the rule parser 221. Additionally or alternatively, the grading summaries may be parsed by the grade reporting subsystem 232 to identify a summary of the conditions and/or grading criteria (e.g., a rubric) used to assess the observations.

A summary reporting subsystem 236 may be configured to parse the grading summaries obtained from the summary creation subsystem 225 of the grading engine 220 and identify a corresponding grading summary that was generated according to a given set of conditions identified by the grade reporting subsystem 232 and/or a given set of observations identified by the observation reporting subsystem 234. The summaries generated by the grade reporting subsystem 232, the observation reporting subsystem 234, and/or the summary reporting subsystem 236 may individually or collectively provide information describing a given set of observations and/or how the observations were graded to provide context for understanding the grading assessment included in the grading summary obtained from the summary creation subsystem 225.

In some embodiments, the observation reporting subsystem 234 may be configured to output observation summary reports that summarize the observations that were assessed in generating the grading summaries. For example, a given observation summary report may relate to grading whether a given vehicle is likely to collide with one or more objects if the given vehicle implements a proposed driving operation. The given observation summary report may indicate that a corresponding grading summary was assessed for a given input bag 204 in a given environment (e.g., clear skies, heavy rain, snow and ice, etc.). In this and other examples, a grading report corresponding to the given observation summary report may indicate that the given vehicle was very likely to collide with another vehicle by implementing the proposed driving operation, and the given observation summary report may specify that the given vehicle is being driven through heavy rain. Consequently, the given observation summary report and the corresponding grading report may or may not be applicable to vehicles operating under clear weather conditions, with light rain, on icy roads, or any other weather conditions that differ from the heavy rain conditions described in the given observation summary report. The observation summary reports may provide situational context for how a particular grading summary was determined and facilitate user review and analysis of various graded scenarios with the associated observation information for context.

In some embodiments, the grading summaries and/or the grading-criteria reports generated by the grade reporting subsystem 232, the observation summary reports generated by the observation reporting subsystem 234, and/or the performance summary reports generated by the summary reporting subsystem 236 (collectively "summary reports") may be obtained by a database handler 238, which may process and store the summary reports in a reports database 240. The stored summary reports may be reviewed and/or analyzed (e.g., by a system operator and/or a machine learning model) to audit the performance of the grading engine 220, audit the performance of the AV, identify ways to improve the rules used by the grading engine 220, diagnose problems with the observation log 224, and/or for any other purposes. Because simulations and/or driving operations may be computed at a rate beyond human comprehension (e.g., hundreds or thousands of simulations performed per second), the summary reports generated by the grading engine 220 may provide a way for a human user to review the results of simulations and/or driving operations that are generated at a rate beyond human comprehension. Such a benefit may allow AV systems to operate in an improved manner by providing enhanced analysis and testing of systems in a manner much more accelerated than that which is possible by a human operator.

For large datasets, there may be multiple compiled reports 245 that are stored on servers corresponding to different reports databases 240 separated by great distances. As such, the database handler 238 may be configured to process any incoming summary reports and determine one or more reports databases 240 to which the summary reports may be sent. For example, the database handler 238 may determine that summary reports originating from AVs physically located in San Francisco should be routed to a reports database 240 in California (e.g., a server for the western continental United States), while summary reports originating from AVs physically located in New York City should be routed to a reports database 240 in New Jersey (e.g., a server for the eastern continental United States). As another example, the database handler 238 may determine that summary reports originating from AVs physically located in Asia should be routed to a reports database 240 in California because a user located in California is performing data analysis of the summary reports from Asia.

In some embodiments, the file reader and player 212 may be communicatively coupled with one or more database handlers 238 to facilitate using the driving operation grading system 200 at a large scale. A large-scale system that implements the driving operation grading system 200 may include multiple database handlers 238 that are configured to communicate with respective reports databases 240 that may be owned by different entities and/or used to store different types of information. Because the file reader and player 212 may be communicatively coupled with the database handlers 238, the driving operation grading system 200 may be natively configured to retrieve information from and/or send information to the correct database handler 238 in a large-scale environment that includes tens, hundreds, thousands, or more reports databases 240.

Modifications, additions, or omissions may be made to the driving operation grading system 200 without departing from the scope of the present disclosure. For example, the designations of different elements in the manner described is meant to help explain concepts described herein and is not limiting. For instance, in some embodiments, the grading engine 220, the reporting system 230, the reports database 240, the input database 202, the database crawler 206, the file list cache 208, the file checker 210, and/or the file reader and player 212 are delineated in the specific manner described to help with explaining concepts described herein but such delineation is not meant to be limiting. Further, the driving operation grading system 200 may include any number of other elements or may be implemented within other systems or contexts than those described.

Figure 3:
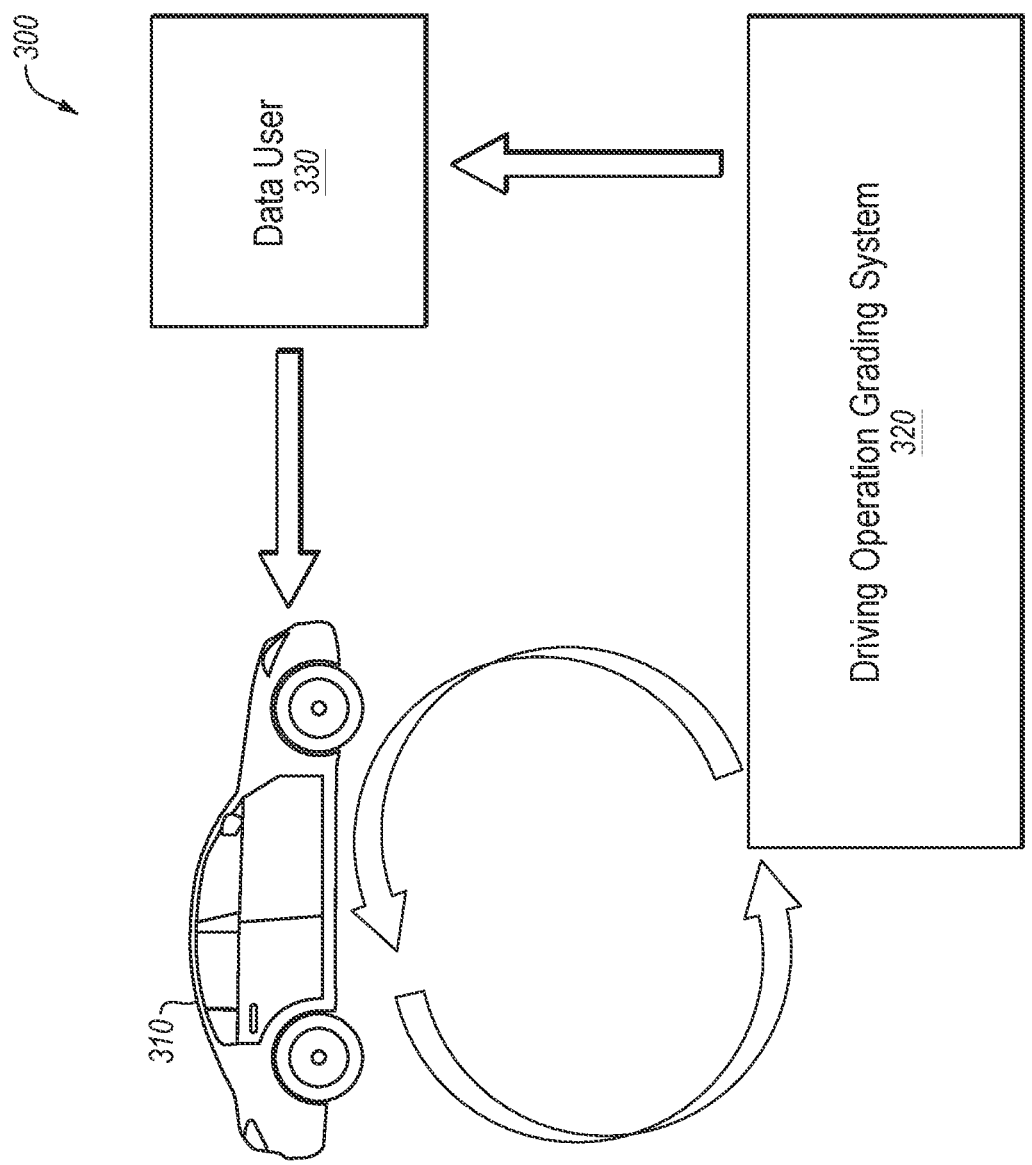
FIG. 3 illustrates an example driving environment that includes a driving operation grading system according to one or more embodiments of the present disclosure.

FIG. 3 illustrates an example driving environment 300 that includes a driving operation grading system 320 according to one or more embodiments of the present disclosure. The driving environment 300 may include a vehicle 310, the driving operation grading system 320, and/or a data user 330. In some embodiments, the driving operation grading system 320 may be the same as or similar to the driving operation grading system 200 described in relation to FIGS. 2A-2C.

The vehicle 310 may include a car that is configured for autonomous operation. For example, the vehicle 310 may include an AV that is configured to perform the operations associated with the autonomous driving system 100 of FIG. 1. Additionally or alternatively, the vehicle 310 may include a car manually operated by a user in which the user of the manually operated car may be present in the car (e.g., a driver of the car) or absent from the car (e.g., as a remote operator of the car). Additionally or alternatively, the vehicle 310 may include any vehicles that are autonomously operated, manually operated, or some combination thereof, such as eighteen-wheeler trucks, construction equipment (e.g., cranes, excavators, bulldozers, etc.), forklifts, stock chasers, drones, aircrafts, or any other vehicles.

In some embodiments, manual and/or autonomous operation of the vehicle 310 may result in the vehicle 310 performing driving and/or other actions that may be represented as information that may be obtained by the driving operation grading system 320. In these and other embodiments, the driving operation grading system 320 may obtain the information provided by driving and/or other actions of the vehicle 310 as part of an input database that is the same as or similar to the input database 202 as described in relation to the driving operation grading system 200 of FIGS. 2A-2C. The information obtained from driving and/or other actions of the vehicle 310 may be compiled as one or more input bags that may be the same as or similar to the input bags 204 described in relation to the driving operation grading system 200 of FIGS. 2A-2C. Additionally or alternatively, the vehicle 310 and/or an autonomous driving system or other driving system implemented in association with the vehicle 310 may obtain grading reports and/or any other outputs of the driving operation grading system 320 in which the grading reports and/or other outputs obtained from the driving operation grading system 320 may provide feedback to the vehicle 310 regarding the safety, the efficiency, the accuracy, and/or any other qualities relating to the driving operations of the vehicle 310.

The driving environment 300 may include a data user 330 that is configured to receive grading summaries and/or any other outputs from the driving operation grading system 320. In some embodiments, the data user 330 may use the received grading summaries and/or other outputs to evaluate the driving operations of the vehicle 310. For example, the data user 330 may include a vehicle manufacturer that compiles grading summaries to monitor the driving operations of vehicles that the manufacturer has sold. The vehicle manufacturer may implement autonomous driving software that may be proprietary or otherwise different from the autonomous driving software used with other vehicles, and the information provided by the driving operation grading system 320 may be used by the vehicle manufacturer to identify bugs in the autonomous driving software. As an additional or alternative example, the data user 330 may include an insurance company that has insured the vehicle 310, and the information provided by the driving operation grading system 320 may facilitate assessing operational risks involving the vehicle 310. As an additional or alternative example, the data user 330 may include a government regulatory entity that may use the information provided by the driving operation grading system 320 to identify dangerous or otherwise problematic driving behaviors associated with one or more of the vehicles 310.

Modifications, additions, or omissions may be made to the driving environment 300 without departing from the scope of the present disclosure. For example, the designations of different elements in the manner described is meant to help explain concepts described herein and is not limiting. For instance, in some embodiments, the vehicle 310, the driving operation grading system 320, and/or the data user 330 are delineated in the specific manner described to help with explaining concepts described herein but such delineation is not meant to be limiting. Further, the driving environment 300 may include any number of other elements or may be implemented within other systems or contexts than those described.

Figure 4:
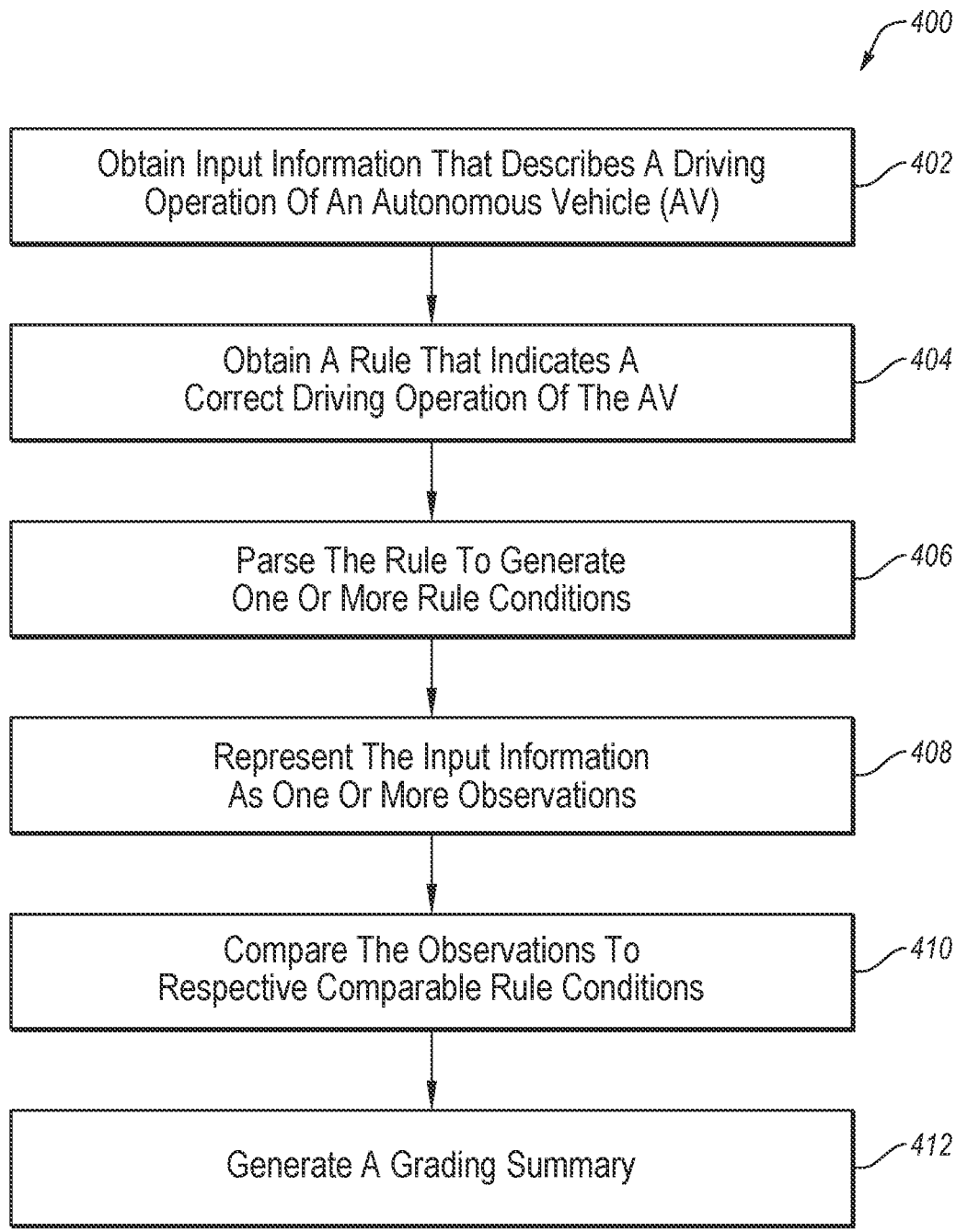
FIG. 4 is a flowchart of an example method of performing same-loop adaptive simulations and computations according to one or more embodiments of the present disclosure.

FIG. 4 is a flowchart of an example method 400 of performing same-loop adaptive simulations and computations according to one or more embodiments of the present disclosure. The method 400 may be performed by any suitable system, apparatus, or device. For example, the grading engine 220, the reporting system 230, the reports database 240, the input database 202, the database crawler 206, the file list cache 208, the file checker 210, and/or the file reader and player 212 of FIGS. 2A-2C may perform one or more operations associated with the method 400. Although illustrated with discrete blocks, the steps and operations associated with one or more of the blocks of the method 400 may be divided into additional blocks, combined into fewer blocks, or eliminated, depending on the particular implementation.

The method 400 may begin at block 402, where input information that describes a driving operation of a given vehicle may be obtained. In some embodiments, the input information may include information retrieved from an input database, such as the input database 202 described in relation to the driving operation grading system 200 of FIGS. 2A-2C, and the input information may be retrieved as packages of information that are the same as or similar to the input bags 204 described in relation to the driving operation grading system 200 of FIGS. 2A-2C. In these and other embodiments, the given vehicle may be an autonomous vehicle. In these and other embodiments, the obtained input information may relate to one, two, five, ten, one hundred, one thousand, ten thousand, one hundred thousand, one million, or a greater number of driving operations. For example, the input information may describe fleet-level driving operations that involve multiple different vehicles.

At block 404, a rule that indicates an approved driving operation of the given vehicle may be obtained. In some embodiments, the rule may be obtained as one or more rule configuration files that are the same as or similar to the rule configuration files 214 of FIGS. 2A-2C.

At block 406, the rule may be parsed using a domain-specific language to generate one or more rule conditions. In some embodiments, parsing the rule using the domain-specific language to generate the one or more rule conditions may involve identifying conditional statements and threshold values corresponding to the rule. Parsing the rule may be facilitated by the rule parser 221 described in relation to the driving operation grading system 200 of FIGS. 2A-2C.

At block 408, the input information may be represented as one or more observations relating to the given vehicle in which each of the observations is comparable to one or more of the rules. In some embodiments, representing the input information as the observations may be facilitated by the observation parser 223 described in relation to the driving operation grading system 200 of FIGS. 2A-2C. In these and other embodiments, the observations may include, for example, a geometry of the given vehicle, an orientation of the given vehicle, a projected movement path of the given vehicle, a starting point of the given vehicle, a destination of the given vehicle, and one or more distances between the given vehicle and one or more objects in the vicinity of the given vehicle, or some combination thereof.

At block 410, the one or more observations may be compared to one or more respective comparable rule conditions. In some embodiments, comparing the observations and the respective comparable rule conditions may involve applying a given observation to each of the rule conditions that involves a metric corresponding to the given observation. For example, the given observation may include an overall length, an overall width, and an overall height of a given vehicle, which may be used to determine whether the given vehicle has collided with a given object according to a given rule condition that checks whether any part of the given vehicle overlaps with any part of the given object. As an additional or alternative example, the given observation may include a bearing of the given vehicle and/or a speed of the given vehicle within a given period of time, which may be used to determine whether the given vehicle is moving at a safe speed and/or adhering to relevant traffic rules (e.g., a speed limit rule).

At block 412, a grading summary that evaluates how well the observations satisfy the respective comparable rule conditions may be generated based on comparing the observations to the respective comparable rule conditions. In some embodiments, the grading summary may provide an indication of how well driving operations of a given vehicle conform with rules that apply to the given vehicle. The grading summary may be generated by the reporting system 230 and/or the summary reporting subsystem 236 as described in relation to the driving operation grading system 200 of FIGS. 2A-2C. In these and other embodiments, the grading summary may include an observation summary and/or a grading criteria summary in which the observation summary indicates one or more respective observations, and the grading criteria summary indicates one or more respective role conditions on which generating the grading summary may be based as described in relation to the observation reporting subsystem 234 and/or the grade reporting subsystem 232 of FIGS. 2A-2C.

In some embodiments, a future driving operation of the given vehicle may be adjusted based on the grading summary. For example, responsive to receiving a given grading summary that indicates a proposed driving operation of the given vehicle is likely to result in the given vehicle colliding with an object in the vicinity of the given vehicle, the proposed driving operation may be adjusted such that the given vehicle prevents the predicted collision from occurring. In these and other embodiments, the method 400 may be used to assess the safety and/or the effectiveness of the adjusted driving operation.

Modifications, additions, or omissions may be made to the method 400 without departing from the scope of the disclosure. For example, the designations of different elements in the manner described is meant to help explain concepts described herein and is not limiting. Further, the method 400 may include any number of other elements or may be implemented within other systems or contexts than those described.

Figure 5:
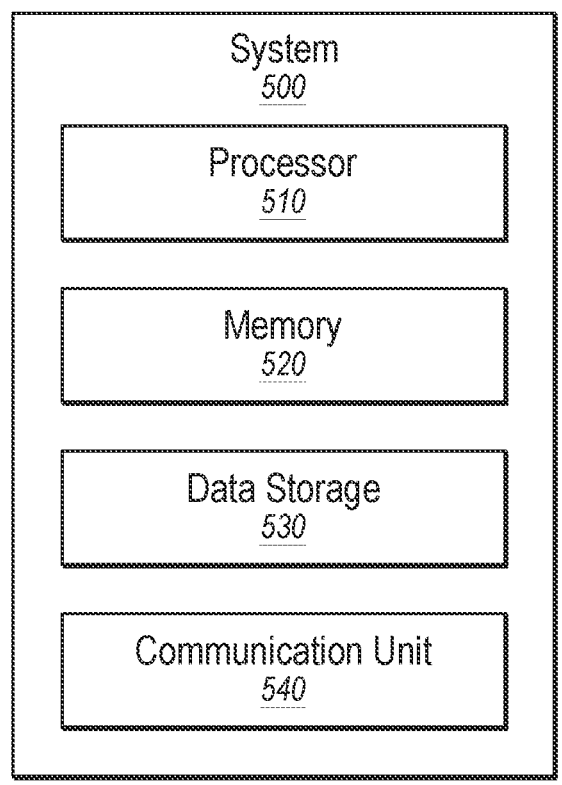
FIG. 5 is an example computing system.

FIG. 5 illustrates an example computing system 500, according to at least one embodiment described in the present disclosure. The computing system 500 may include a processor 510, a memory 520, a data storage 530, and/or a communication unit 540, which all may be communicatively coupled. Any or all of the driving operation grading system 200 of FIGS. 2A-2C may be implemented as a computing system consistent with the computing system 500, including the grading engine 220, the reporting system 230, the reports database 240, the input database 202, the database crawler 206, the file list cache 208, the file checker 210, and/or the file reader and player 212.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of network or physical locations that are configured to perform individually or collectively any number of operations described in the present disclosure. In some embodiments, the processor 510 may interpret and/or execute program instructions and/or process data stored in the memory 520, the data storage 530, or the memory 520 and the data storage 530. In some embodiments, the processor 510 may fetch program instructions from the data storage 530 and load the program instructions into the memory 520.

After the program instructions are loaded into the memory 520, the processor 510 may execute the program instructions, such as instructions to perform operations associated with the grading engine 220, the reporting system 230, the reports database 240, the input database 202, the database crawler 206, the file list cache 208, the file checker 210, and/or the file reader and player 212.

The memory 520 and the data storage 530 may include computer-readable storage media or one or more computer-readable storage mediums for having computer-executable instructions or data structures stored thereon. Such computer-readable storage media may be any available media that may be accessed by a general-purpose or special-purpose computer, such as the processor 510. For example, the memory 520 and/or the data storage 530 may store the grading summaries, the grading-criteria reports, the observation summary reports, and/or the driving operation reports generated by the grading engine 220. In some embodiments, the computing system 500 may or may not include either of the memory 520 and the data storage 530.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 540 may include any component, device, system, or combination thereof that is configured to transmit or receive information over a network. In some embodiments, the communication unit 540 may communicate with other devices at other locations, the same location, or even other components within the same system. For example, the communication unit 540 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 540 may permit data to be exchanged with a network and/or any other devices or systems described in the present disclosure. For example, the communication unit 540 may allow the system 500 to communicate with other systems, such as computing devices and/or other networks.

One skilled in the art, after reviewing this disclosure, may recognize that modifications, additions, or omissions may be made to the system 500 without departing from the scope of the present disclosure. For example, the system 500 may include more or fewer components than those explicitly illustrated and described.

The embodiments described in the present disclosure may include the use of a special purpose or general-purpose computer including various computer hardware or software modules. Further, embodiments described in the present disclosure may be implemented using computer-readable media for having computer-executable instructions or data structures stored thereon.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
    obtaining input information that describes a driving operation of a vehicle;
    obtaining a rule that indicates an approved driving operation of the vehicle, the rule including a conditional representation of a relationship between the vehicle and an object in a vicinity of the vehicle;
    parsing the rule using a domain-specific language to generate one or more rule conditions including binary operators, the domain-specific language including a programming language that is specifically designed for analyzing autonomous operation of vehicles;
    representing the input information as one or more observations relating to the vehicle in which each of the observations includes a quantifiable parameter that is comparable to at least one respective rule condition;
    comparing the one or more observations to one or more respective comparable rule conditions;
    generating a grading summary that includes:
        the one or more observations;
        the quantifiable parameter corresponding to each of the one or more observations;
        the rule that indicates the approved driving operation of the vehicle used to assess the one or more observations;
        the one or more rule conditions corresponding to the rule; and
        a grade indicating how well the one or more observations satisfy the respective comparable rule conditions;
    adjusting a future driving operation of the vehicle based on the grading summary;
    sending the grading summary to a grading report data storage; and
    making available, to a data user, the grading summary from the grading report data storage such that the data user is able to perform an analysis task based on the available grading summary.

2. The method of claim 1, wherein the grading summary includes an observation summary and a grading criteria summary, the observation summary indicating one or more respective observations and the grading criteria summary indicating one or more respective role conditions on which generating the grading summary was based.

3. The method of claim 1, wherein parsing the rule using the domain-specific language to generate the one or more rule conditions includes identifying conditional statements and threshold values corresponding to the rule.

4. The method of claim 1, wherein the observations include mathematical representations of at least one of: a geometry of the vehicle, an orientation of the vehicle, a projected movement path of the vehicle, a starting point of the vehicle, a destination of the vehicle, and one or more distances between the vehicle and one or more objects in a vicinity of the vehicle.

5. The method of claim 1, wherein the method is performed autonomously without interaction from a human user.

6. The method of claim 1, wherein the method is performed with respect to input information that describes one million or more driving operations.

7. The method of claim 1, wherein the vehicle is an autonomous vehicle.

8. One or more non-transitory computer-readable storage media configured to store instructions that, in response to being executed, cause a system to perform operations, the operations comprising:
    obtaining input information that describes a driving operation of a vehicle;
    obtaining a rule that indicates an approved driving operation of the vehicle, the rule including a conditional representation of a relationship between the vehicle and an object in a vicinity of the vehicle;
    parsing the rule using a domain-specific language to generate one or more rule conditions including binary operators, the domain-specific language including a programming language that is specifically designed for analyzing autonomous operation of vehicles;
    representing the input information as one or more observations relating to the vehicle in which each of the observations includes a quantifiable parameter that is comparable to at least one respective rule condition;
    comparing the one or more observations to one or more respective comparable rule conditions;
    generating a grading summary that includes:
        the one or more observations;
        the quantifiable parameter corresponding to each of the one or more observations;
        the rule that indicates the approved driving operation of the vehicle used to assess the one or more observations;
        the one or more rule conditions corresponding to the rule; and
        a grade indicating how well the one or more observations satisfy the respective comparable rule conditions;
    adjusting a future driving operation of the vehicle based on the grading summary;
    sending the grading summary to a grading report data storage; and
    making available, to a data user, the grading summary from the grading report data storage such that the data user is able to perform an analysis task based on the available grading summary.

9. The one or more non-transitory computer-readable storage media of claim 8, wherein the grading summary includes an observation summary and a grading criteria summary, the observation summary indicating one or more respective observations and the grading criteria summary indicating one or more respective role conditions on which generating the grading summary was based.

10. The one or more non-transitory computer-readable storage media of claim 8, wherein parsing the rule using the domain-specific language to generate the one or more rule conditions includes identifying conditional statements and threshold values corresponding to the rule.

11. The one or more non-transitory computer-readable storage media of claim 8, wherein the observations include mathematical representations of at least one of: a geometry of the vehicle, an orientation of the vehicle, a projected movement path of the vehicle, a starting point of the vehicle, a destination of the vehicle, and one or more distances between the vehicle and one or more objects in a vicinity of the vehicle.

12. The one or more non-transitory computer-readable storage media of claim 8, wherein the operations are performed autonomously without interaction from a human user.

13. The one or more non-transitory computer-readable storage media of claim 8, wherein the operations are performed with respect to input information that describes one million or more driving operations.

14. The one or more non-transitory computer-readable storage media of claim 8, wherein the vehicle is an autonomous vehicle.

15. A system comprising:
one or more processors; and
one or more non-transitory computer-readable storage media configured to store instructions that, in response to being executed, cause the system to perform operations, the operations comprising:
obtaining input information that describes a driving operation of a vehicle;
obtaining a rule that indicates an approved driving operation of the vehicle, the rule including a conditional representation of a relationship between the vehicle and an object in a vicinity of the vehicle;
parsing the rule using a domain-specific language to generate one or more rule conditions including binary operators, the domain-specific language including a programming language that is specifically designed for analyzing autonomous operation of vehicles;
representing the input information as one or more observations relating to the vehicle in which each of the observations includes a quantifiable parameter that is comparable to at least one respective rule condition;
comparing the one or more observations to one or more respective comparable rule conditions;
generating a grading summary that includes:
the one or more observations;
the quantifiable parameter corresponding to each of the one or more observations;
the rule that indicates the approved driving operation of the vehicle used to assess the one or more observations;
the one or more rule conditions corresponding to the rule; and
a grade indicating how well the one or more observations satisfy the respective comparable rule conditions;
adjusting a future driving operation of the vehicle based on the grading summary;
sending the grading summary to a grading report data storage; and
making available, to a data user, the grading summary from the grading report data storage such that the data user is able to perform an analysis task based on the available grading summary.

16. The system of claim 15, wherein the grading summary includes an observation summary and a grading criteria summary, the observation summary indicating one or more respective observations and the grading criteria summary indicating one or more respective role conditions on which generating the grading summary was based.

17. The system of claim 15, wherein parsing the rule using the domain-specific language to generate the one or more rule conditions includes identifying conditional statements and threshold values corresponding to the rule.

* * * * *